(12) United States Patent
Puchek et al.

(10) Patent No.: US 6,496,595 B1
(45) Date of Patent: Dec. 17, 2002

(54) DISTRIBUTED BIOMETRIC ACCESS CONTROL APPARATUS AND METHOD

(75) Inventors: Daniel R. Puchek; Tianning Xu; David M. Tumey, all of San Antonio, TX (US)

(73) Assignee: Nextgenid, Ltd., San Antonio, TX (US)

( * ) Notice: Subject to any disclaimer, the term of this patent is extended or adjusted under 35 U.S.C. 154(b) by 0 days.

(21) Appl. No.: 09/574,001

(22) Filed: May 19, 2000

(51) Int. Cl.[7] .................................................. G06K 9/00
(52) U.S. Cl. ...................... 382/124; 382/118; 382/116; 340/5.8
(58) Field of Search ......................... 382/115–119, 124; 902/3–6; 235/380, 382, 382.5; 713/182, 186; 340/5.1, 5.2, 5.5, 5.52, 5.7, 5.8, 5.81, 5.82

(56) References Cited

U.S. PATENT DOCUMENTS

| | | |
|---|---|---|
| 4,006,459 A | 2/1977 | Baker et al. |
| 4,245,213 A | 1/1981 | Kriger |
| 4,449,189 A | 5/1984 | Feix et al. |
| 4,471,343 A | 9/1984 | Lemelson |
| 4,712,103 A | 12/1987 | Gotanda |
| 4,993,068 A | 2/1991 | Piosenka et al. |
| 5,053,608 A | 10/1991 | Senanayake |
| 5,229,764 A | 7/1993 | Matchett et al. |
| 5,259,025 A | 11/1993 | Monroe et al. |
| 5,280,266 A | 1/1994 | Kao |
| 5,283,644 A | 2/1994 | Maeno |
| 5,305,390 A | 4/1994 | Frey et al. |
| 5,386,103 A | 1/1995 | Deban et al. |
| 5,408,536 A | 4/1995 | Lemelson |
| 5,412,738 A | 5/1995 | Brunelli et al. |
| 5,469,506 A | 11/1995 | Berson et al. |
| 5,608,387 A | 3/1997 | Davies |
| 5,642,431 A | 6/1997 | Poggio et al |
| 5,666,106 A | 9/1997 | Nasman |
| 5,715,325 A | 2/1998 | Bang et al. |
| 5,719,950 A | 2/1998 | Osten et al. . |
| 5,761,329 A | 6/1998 | Chen et al. |
| 5,802,199 A | 9/1998 | Pare, Jr. et al. |
| 5,805,719 A | 9/1998 | Pare, Jr. er al. |
| 5,815,252 A | 9/1998 | Price-Francis |
| 5,850,470 A | 12/1998 | Kung et al. |
| 5,862,297 A | 1/1999 | Timmermans |
| 5,892,838 A | 4/1999 | Brady |
| 5,901,238 A | 5/1999 | Matsushita |
| 5,903,225 A | 5/1999 | Schmitt et al. |
| 6,160,903 A * | 12/2000 | Hamid et al. ................ 382/115 |

OTHER PUBLICATIONS

"Physical Security and Staff Tracking Solutions", 3 pages, Aug. 20, 1999.
"Touchlook II™", 5 pages, Aug. 20, 1999.
"The LBV®", 5 pages, Aug. 16, 1999.

* cited by examiner

Primary Examiner—Joseph Mancuso
Assistant Examiner—Vikkram Bali
(74) Attorney, Agent, or Firm—Nixon Peabody LLP; Marc S. Kaufman (57) ABSTRACT

An access control apparatus and method. Enrollment is conducted at a centralized server and enrollment data, such as identification data is downloaded to plural local access units at respective entrances to a restricted area. The local access units then collect data of a person upon an attempted entry in to the area and compare the data with downloaded enrollment data to determine if the person is authorized for access. If the person is authorized, an access control device is operated to open a door, gate, or the like of the entrance. The enrollment data can be biometric data and the same type or different type of biometric data can be collected at the local access units. If a different type of data is collected at the local access units and is correlated to data stored on the local access unit, data of the same type as the downloaded data is collected and compared to the downloaded data for access control. The enrollment data can be non environmentally affected data, such as fingerprint parameter data and the different type of data can be environmentally affected data, such as facial parameter data.

27 Claims, 4 Drawing Sheets

DISTRIBUTED BIOMETRIC ACCESS CONTROL APPARATUS AND METHOD

BACKGROUND OF THE INVENTION

1. Field of the Invention

The invention relates to automated systems for permitting authorized persons to access secured buildings or other areas while preventing such access by unauthorized persons. More particularly, the invention relates to an access control system which uses biometric parameters to identify authorized persons and to permit access by the authorized persons.

2. Description of the Related Art

The invention relates to restricting access into a restricted area and thus the term "access", as used herein, refers to physical entry into a building, or other restricted area. However, the restricted area can be the exterior of a building or the like and thus the invention can be applied to controlling entry or exit out of a building or other area. There have always been situations in which it was desirable to restrict access to certain physical areas to a select person or group of people. Such restricted access has been accomplished by fences, walls, locks and other barriers. However, even the use of barriers has not prevented unauthorized access. Accordingly, it has been necessary in many instances to provide human surveillance in the form of a security guard at an entrance to an area or through the use of video cameras or the like to transmit images to a security guard at a remote or centralized location. Of course, the use of security guards and video cameras can become expensive and is only as reliable as the particular guard and his state of alertness at any particular time.

The complexities of modern society have only served to increase the need for access control. For example, many government agencies and contractors work on matters that are of a confidential or even "top secret" nature. In fact, most workplaces, such as offices, warehouses, and even retail stores in some instances, have a need to implement access control to prevent the theft of intellectual property and/or goods.

In response to the need for access control, many government agencies and businesses have issued identification cards to their employees and other authorized personnel. Often, the identification card includes a picture of the authorized person. However, such an identification card still requires a security guard or other personnel for verification. Also, such cards are easily forged by replacing the picture with that of an unauthorized person. To overcome these limitations, it is known to provide the employee with a personal identification number (PIN) or other identifying code. The identifying code can be encoded in a magnetic strip or the like in a security card and read by an automated reader at an entrance to grant access only to persons having the card. Alternatively, the code can be entered by the user on a keypad to gain access. However, the use of identifying codes also has drawbacks in access control applications. In particular, the identification card can be stolen or the user can be forced under duress to reveal their code. In such cases, unauthorized possessors of the card or code can gain access to a restricted area.

The use of biometrics has been proposed as a solution to the limitations noted above. Generally, the term "biometrics" refers to the study of measurable biological characteristics, i.e. biometric parameters, of a living being. In the context of security, "biometrics" refers to techniques that rely on a unique, measurable characteristic of a living being for automatically recognizing or verifying identity. Examples of biometric parameters are facial data, retinal data, fingerprint data, speech data, and the like.

Generally, biometric systems operate in the following manner. First, a system captures a sample of at least one biometric parameter during an "enrollment" process. The parameters are then converted by the system into a mathematical code, i.e., data, that is stored as the biometric template representing measured biometric parameters for that person. There may also be a way to correlate the template to the person. For example, a personal identification number (PIN) can be given to an enrolled user, which is entered to access the template. A new biometric sample is then taken and compared to the template or to a group of templates. If one of the templates and the new sample match, the person is recognized as authorized. Central to a biometric system is the "engine" which processes the biometric data in accordance with various algorithms or artificial neural networks.

Some biometric systems use "identification" methods and some use "verification" methods. In identification systems, a sample is presented to the biometric system and the system then attempts to find out who the sample belongs to by comparing the sample with a plurality of templates obtained through enrollment. Verification systems on the other hand perform a one-to-one process where the biometric system is seeking to verify identity. A single biometric sample is matched against a single template obtained during enrollment. If the two match, the system effectively confirms that the person actually is who he presents himself to be. The key difference between these two approaches centers on the logic addressed by the biometric system and how these fit within a given application. Identification systems decide who the person is and can check whether more than one matching biometric template exists. Accordingly, identification systems can deny access to an individual who is attempting to pass himself off with more than one identity. Verification, on the other hand only decides if the person is who he says he is. Accordingly, identification systems are more versatile and powerful. However, verification systems generally require less processing horsepower and thus are commonly used.

In typical biometric access control systems, biometric sensors are placed proximate entrances and are linked to a central computer having biometric "enrollment" data, i.e., templates, representing biometric parameters of authorized users collected from a central enrollment station. If the biometric parameter collected at the entrance matches a template stored in the central computer, access is granted. However, conventional biometric systems have several limitations. In particular, the sensing accuracy of biometric parameters, such as facial parameters, retinal parameters, and the like is highly dependent on the environment in which the parameters are sensed. For example, the lighting intensity, angle and color will affect sensing of biometric parameters. Accordingly, the ability to reliably match data representing parameters collected at an entrance with data of templates collected during enrollment is limited, especially when the entrance is an external entrance where the weather, season, and time of day will affect lighting significantly. Also, sensing biometric parameters, converting the parameters to data, communicating the data to a central computer, and comparing the data parameters with templates of enrollment data in the central computer is relatively time consuming, even with modern high speed computers and communication links. Accordingly, such systems present significant inconveniences to the authorized persons through improperly rejected access and time delays prior to granting access.

The use of less environmentally affected biometric parameters, such as fingerprint parameters can alleviate some of the problems noted above. However, sensing such parameters requires that the person desiring access make physical contact with a sensor, such as a fingerprint scanner, upon each entry request. Also, such parameters are easily affected by skin debris, and skin blemishes. Therefore, the person desiring access may have to wipe off their finger, not to mention remove any gloves, prior to submitting to the physical contact with the sensor. The match tolerance between a template and data corresponding to a measured parameter can be increased to minimize lockout of authorized users. However, such an approach inherently reduces the accuracy and effectiveness of the system by increasing the likelihood of allowing access to unauthorized users.

U.S. Pat. No. 5,802,199 attempts to solve the issue of slow response in biometric identification systems by transmitting a subset of templates obtained through enrollment from a central computer to one of plural "local" computers. If the user attempts to use an ATM terminal that corresponds to the "local" computer, identification is accomplished by collection of biometric data and a PIN number and by comparison with templates in the "local" computer. If a matching template and PIN number is not in the "local" computer, biometric identification is accomplished in the central computer by transmitting collected data over a remote communication link.

U.S. Pat. No. 5,802,199 relates to identification for allowing use of ATM terminals and not for access control as defined herein. The practical communications of access control and ATM use control are quite different. For example, the "local" computers disclosed in U.S. Pat. No. 5,802,199 are apparently not at the location of biometric sampling, i.e. the ATM terminal. It appears that plural ATM terminals are assigned to each local computer because of the inherent geographic distribution of ATM terminals. The "local" computers are actually centralized computers. Accordingly, the system disclosed in U.S. Pat. No. 5,802, 199 is not suitable for high speed access control which generally requires high speed identification within a relatively small geographic area, such as a single building or campus. Also, since enrollment is conducted centrally, i.e. not at the site of the ATM terminal, environmental variables will affect the accuracy of identification. Finally, this system requires that two separate things be recognized, the biometric sample parameters and a PIN number entered by the user.

U.S. Pat. No. 5,903,225 discloses an access control system in which data is encoded on a card during an enrollment procedure in correspondence to the person's fingerprint. When attempting to gain access to a restricted area, a transmitter on the card transmits the data to a receiver at the entrance to grant access. This system apparently does not implement biometric recognition or identification and thus has the same limitations as conventional access systems using magnetic cards. In particular, whoever possesses the card is granted access regardless of their identity.

U.S. Pat. No. 4,993,068 discloses an access system in which the enrollment procedure includes recording biometric data on a card to be carried by the user and comparing the data on the card with data of biometric parameters measured at the entrance. This system is inherently a verification system and thus is not as flexible as an identification system for the reasons discussed above. Also, since enrollment is conducted at a central location, sensing of parameters upon access can be affected by the environment at the entrance. Accordingly, the accuracy of this system is limited.

SUMMARY OF THE INVENTION

It is an object of the invention to overcome the limitations of the known systems described above.

It is an object of the invention to maximize the speed of biometric identification access control.

It is another object of the invention to maximize the accuracy of biometric identification access control.

It is another object of the invention to minimize the inconvenience and obtrusiveness of biometric identification access control.

It is another object of the invention to minimize the effect of environmental variables in biometric identification access control.

It is another object of the invention to clearly indicate any security anomaly in a biometric identification access control system.

A first aspect of the invention is an apparatus for controlling access into an area comprising a server including server memory and a server data collection device configured to collect identification data assigned to each authorized person, a local access unit located at an entrance to the area and including local memory, a local processor, a local biometric parameter sensing device, a local data collection device and an access control device, and a communication channel for downloading the identification data from the server to the local access unit. The local processor is operative to compare biometric parameter data of a person proximate the entrance collected by the local biometric parameter sensing device with biometric parameter data stored in the local memory and to grant access to the area by operating the access control device if the biometric parameter data collected by the local biometric parameter sensing device and biometric parameter data stored in the local memory correspond to one another. The processor is also operative to prompt the person to enter the identification data through the local data collection device and grant access to the area by operating the access control device only when the identification data of an authorized person is entered if the biometric parameter data collected by the local biometric parameter sensing device and the biometric parameter data stored in the local memory do not correspond. The processor is also operative to store the biometric parameter data collected by the local biometric parameter sensing device in correspondence with the entered identification data in the local memory when the biometric parameter data collected by the local biometric parameter sensing device and the biometric parameter data stored in the local memory do not correspond and identification data of an authorized person is entered through the local data collection device.

A second aspect of the invention is an apparatus for controlling access into an area comprising a server including server memory and a server data collection device configured to collect identification data assigned to each authorized person, plural local access units located at respective entrances, each local access unit including local memory, a local processor, a local data collection device and an entrance control device, and a communication channel for downloading the identification data from the server to each of the plural access terminals. The processor is operative to compare data collected by one of the local access units with data downloaded over the communication channel and operate the entrance control device based on results of the comparison.

A third aspect of the invention is a method of controlling access into an area comprising the steps of collecting identification data assigned to an authorized person with a server, downloading the identification data from the server to a local access unit located at an entrance and having an access control device, comparing biometric parameter data of a person collected proximate the entrance by the local access unit with biometric parameter data stored in the local access unit and granting access by operating the access control device if the biometric parameter data collected proximate the entrance and biometric parameter data stored in the local access unit correspond to one another, prompting the person to enter the identification data into the local access unit and granting access by operating the access control device only when the identification data of an authorized person is entered if the biometric parameter data collected proximate the entrance and the biometric parameter data stored in said local access unit do not correspond, and storing the biometric parameter data collected proximate the entrance in correspondence with the entered identification data in the local access unit when the biometric parameter data collected proximate the entrance and the biometric parameter data stored in the local access unit do not correspond and identification data of an authorized person is entered through the local access unit.

A fourth aspect of the invention is a method of controlling access into an area comprising the steps of collecting identification data assigned to an authorized person with a server, downloading the identification data from the server to each of plural access units located at respective entrances to the area and including an entrance control device, collecting data with one of the local access units, comparing the data collected by the local access unit with the identification data downloaded during the downloading step, and operating the entrance control device based on results of said comparing step.

A fifth aspect of the invention is a method of controlling access into an area comprising the steps of a primary enrollment in which identification data is assigned to an authorized person, an identification step in which a biometric parameter is sensed and converted to biometric parameter data and in which the biometric parameter data is compared to stored biometric parameter data, an access granting step when the biometric parameter data corresponds to the stored biometric parameter data in the identification step, and a secondary enrollment step in which the biometric parameter data is stored as the stored biometric parameter data when the biometric parameter data does not correspond to the stored biometric parameter data in the identification step and the identification data is entered.

BRIEF DESCRIPTION OF THE DRAWING

The invention is described through a preferred embodiment and the attached drawing in which.

DETAILED DESCRIPTION OF THE PREFERRED EMBODIMENT

Figure 1:
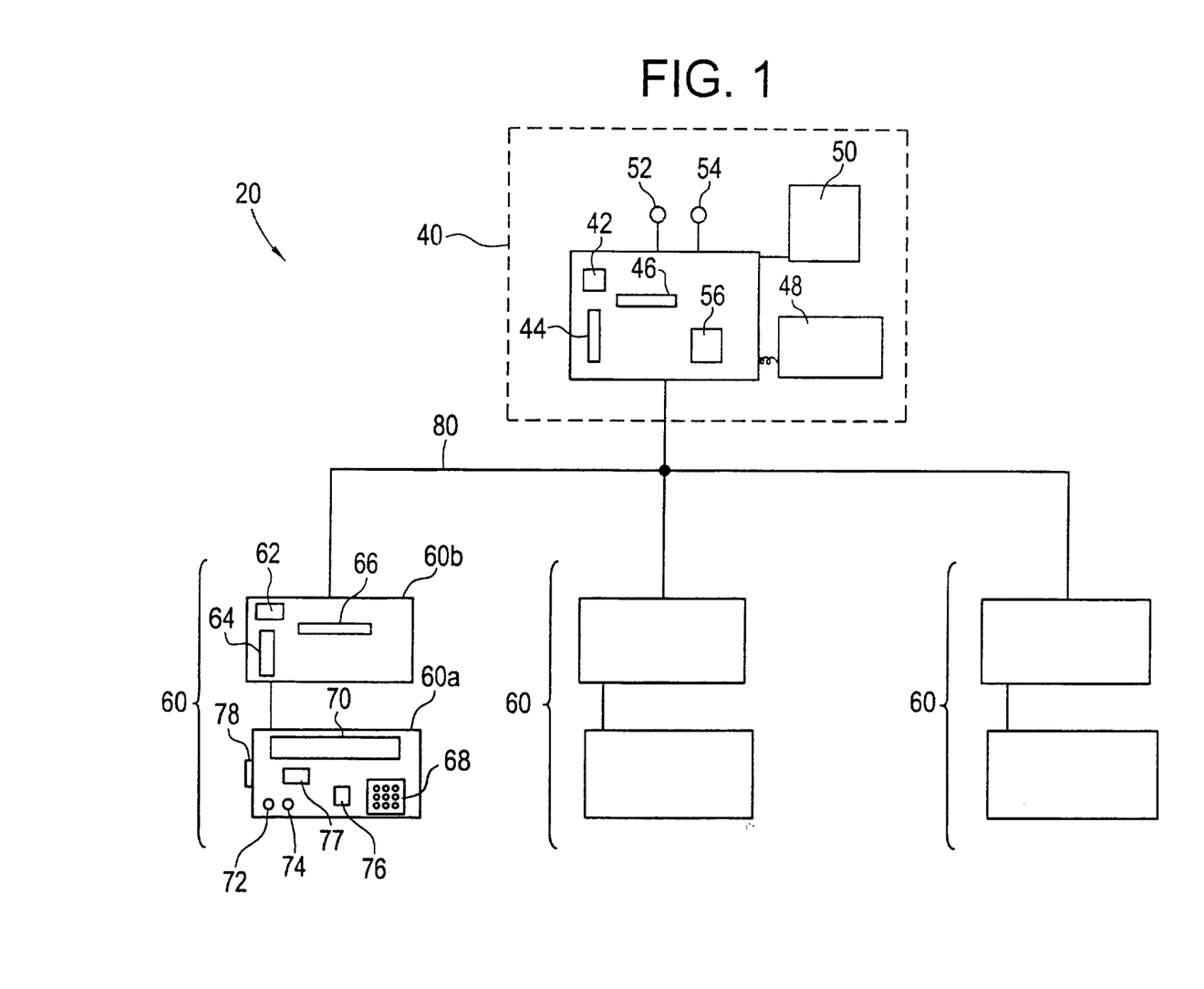
FIG. 1 is a block diagram of the architecture of an access control system of the preferred embodiment.

FIG. 1 illustrates the system architecture of a preferred embodiment of the invention. Biometric access control system 20 includes server 40, plural local access units 60, and communications channel 80. Server 40 and local access units 60 can each include microprocessor based digital computers as described in detail below. In the preferred embodiment, communications channel 80 is a local area network (LAN) such as an Ethernet network communicating over a coaxial cable or unshielded twisted pair (UTP). However, communication channel 80 can be any type of communication channel using cables, radio frequency transmission, optical transmission over fibers, infrared transmission, or any other wired or wireless communication mode capable of providing the communication described herein. Any communications protocols and transmission medium can be used. For example, communication channel 80 can be the Internet and each computer can have a separate IP address. Also, communication channel 80 can be accomplished merely by physically moving a removable recording medium, such as a diskette, between server 40 and access terminals 60; a channel sometimes referred to as "sneaker-net".

Server 40 is a digital microprocessor based computer, such as a personal computer, a minicomputer, a programmable logic controller, or any other proprietary or non-proprietary device capable of accomplishing the processing and communication functions described below. Server 40 includes central processing unit (CPU) 42, memory device 44 (such as a magnetic hard drive), random access memory (RAM) 46, input device 48 (such as a keyboard and mouse), display 50, microphone 52, speaker 54, biometric parameter sensing device 56, a data bus (not illustrated) for providing communications between the various components and the appropriate interfaces for each component (also not illustrated). Biometric parameter sensing device 56 serves to collect identification data during an enrollment procedure, as described below, and can be of any type, such as a fingerprint scanner, a camera for sensing facial parameters, a retinal scanner, or the like. For the sake of discussion of the preferred embodiment, it is assumed herein that biometric parameter sensing device 56 is a fingerprint scanner capable of sensing parameters relating to a persons fingerprint. Server 40 has a control program stored on memory device 44 which includes instructions for accomplishing the functions described below. The control program of server 40 also includes a biometric engine such as that described in U.S. Pat. No. 5,386,103, the disclosure of which is incorporated herein by reference.

Local access unit 60 also is a digital microprocessor based computer, such as a personal computer, a minicomputer, a programmable logic controller, or any other proprietary or non-proprietary device capable of accomplishing the processing and communication functions described below. Only one local access unit 60 is illustrated in detail and discussed in detail below. However, each local access unit is similar and thus the description below applies to each local access unit 60. Local access unit 60 includes central processing unit (CPU) 62, memory device 64 (such as a magnetic hard drive), random access memory (RAM) 66, input device 68 (such as a keypad), display 70, microphone 72, speaker 74, biometric parameter sensing device 76 (serving as an auxiliary biometric parameter sensing device), biometric parameter sensing device 77, access control device 78 (such as a lock solenoid, gate, or the like), a data bus (not illustrated) for providing communications between the various components, and the appropriate interfaces for each component (not illustrated). Biometric parameter sensing device 76 preferably is of the same type, i.e. senses the same biometric parameters, as biometric parameter sensing device 56 of server 40, a fingerprint scanner in the preferred embodiment. Biometric parameter sensing device 77 can be of any type but is preferably of a different.type, i.e. senses different biometric parameters, than biometric parameter sensing device 76. In the preferred embodiment, biometric parameter sensing device 77 is a camera for sensing facial parameters.

Each local access unit 60 has a control program stored in memory device 64 which includes instructions for accomplishing the functions described below. The control programs of local access units 60 also include a biometric engine, such as that described in U.S. Pat. No. 5,386,103. Each local access unit 60 can include access panel 60a (including input device 68, display 70, microphone 72, speaker 74, biometric parameter sensing device 76, biometric parameter sensing device 77, and access control device 78) and controller 60b (including CPU 62, memory device 64, and RAM 66). Access panel 60a and controller 60b can be housed separately. However, it will become apparent below that access panel 60a and controller 60b preferably are located in close proximity to one another. The number of physical enclosures associated with local access unit 60 can vary as is required by the particular application and entrance.

Server 40 can be disposed at any location in the building or other area to which access control system 20 is being applied or at a remote location. Also, server 40 can be any one of plural computers coupled to a network or can be embodied by plural computers on the network each conducting a different portion of the function of server 40. For example, the enrollment procedure disclosed below can be conducted on one computer and the anomaly monitoring functions disclosed below can be conducted by another computer with the two computers together constituting server 40. Local access units 60 on the other hand are located in close proximity to respective doors or other entrances of the building or other area to which access control system 20 is applied. Typically, access panels 60a are located just outside the doorframe and controllers 60b are located inside an entrance to the building or other area to prevent tampering therewith. However, controllers 60b are preferably located close enough to respective access panels 60a to allow local communications through a serial port, parallel port, Universal Serial Bus (USB) port or the like.

Figure 2:
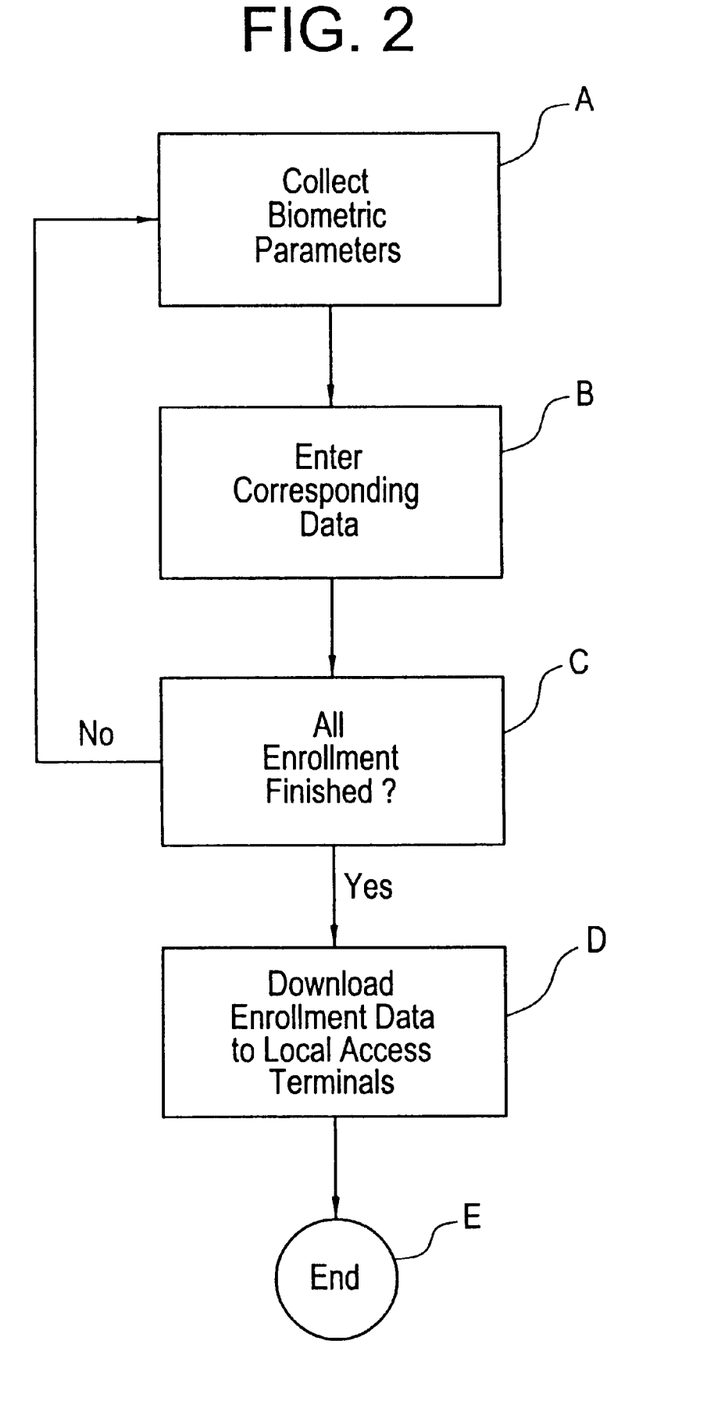
FIG. 2 is a flow chart of the primary enrollment procedure of the preferred embodiment.

FIG. 2 illustrates the primary enrollment procedure of the preferred embodiment in which persons are authorized for access. A person to be allowed access to the area controlled by system 20 is brought to an enrollment location proximate server 40. Biometric parameters are sensed by biometric parameter sensing device 56 of server 40 in step A. This is accomplished by placing the finger of the person on a sensing surface of biometric parameter sensing device 56 and selecting appropriate menu choices displayed on display 50 in accordance with the control program stored in memory device 44 and being executed by CPU 42. Data corresponding to the sensed parameters is thus collected and recorded in memory device 44. Using input device 48, corresponding data, such as the authorized persons name, title, access privileges, and the like is entered in step B and stored in memory device 44 in correspondence to the data stored in step A.

In step C, it is determined if all enrollment is finished, i.e. if the operator of server 40 does not wish to enroll other persons at this time. If so, the procedure continues to step D, if not, the procedure returns to step A for collection of biometric parameter data for another person. In step D, enrollment data, including biometric data and corresponding data entered in steps A and B respectively, is downloaded to each local access unit 60. The enrollment data can be stored in memory device 64 of each local access unit as templates in any format, such as known database formats. Accordingly, the templates are stored in each local access terminal and are constantly or periodically updated with any new enrollment data collected during a primary enrollment procedure. Step D can be conducted immediately after step C or can be delayed to download data in a batch process. The primary enrollment procedure comes to an end in step E. Of course, the primary enrolment procedure can be accomplished at any time and one or more persons can be enrolled during each procedure. Also, enrollment data can be deleted or modified as needed. For example, when an employee leaves a company it may be desirable to delete his template so that he cannot be granted access to the building or other area. Also, when a person is promoted, their access privileges may be increased. Further, a terminated employees template may be left while his access privileges are revoked. In such a situation presence of the terminated employee can be flagged as an anomaly as described below.

Figure 3:
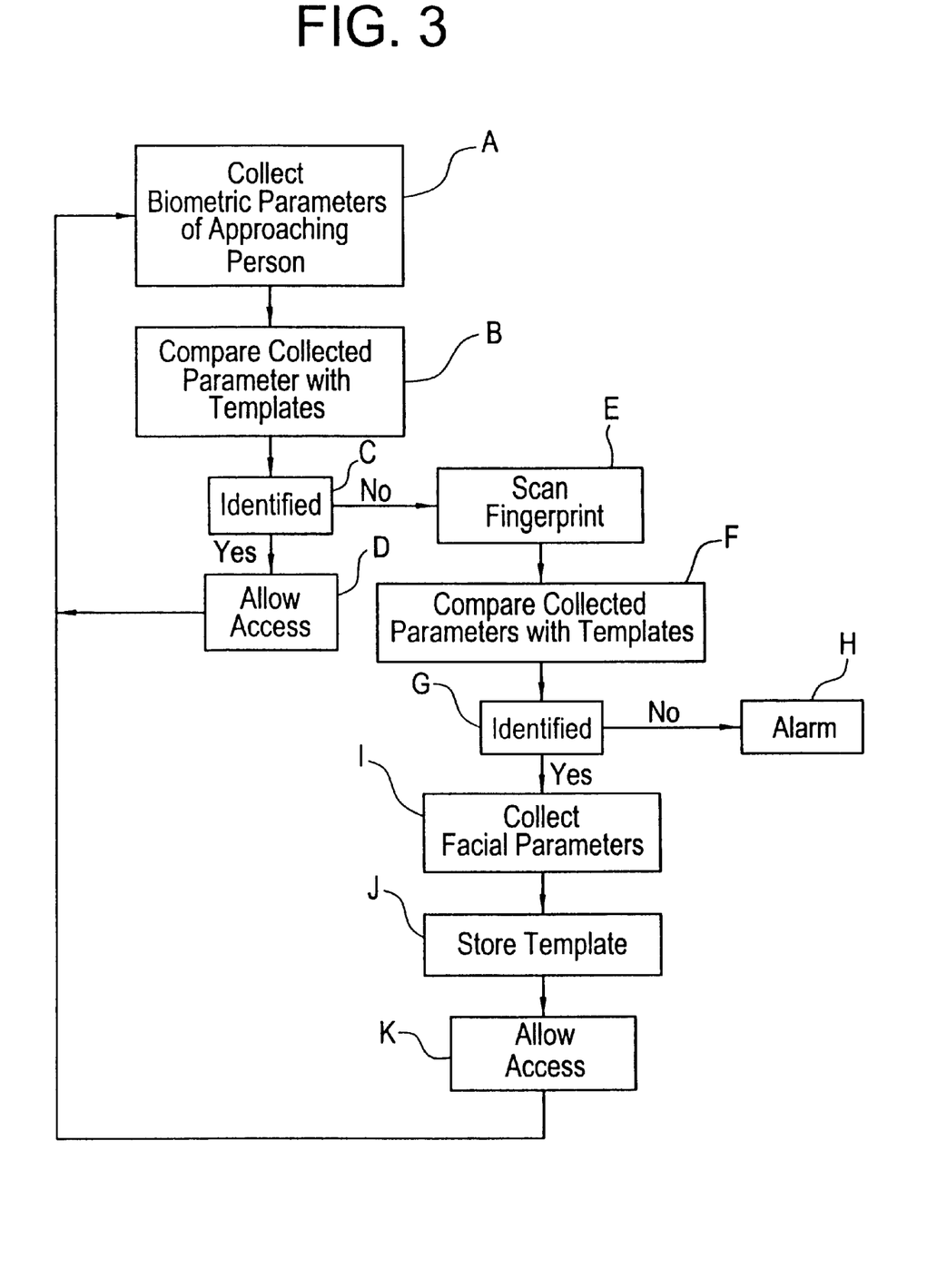
FIG. 3 is a flow chart of the identification and secondary enrollment procedures of the preferred embodiment.

When primary enrollment for one or more authorized persons is finished, system 20 is ready to identify authorized persons and control access to a building or other area. FIG. 3 illustrates the procedure for controlling access. As a person approaches an entrance having remote access unit 60, biometric parameter sensing device 77 begins to sense parameters, e.g. facial image parameters, in an attempt to identify the person as an authorized person. For example, biometric parameter sensing device 77 can be in constant operation and can begin to sense facial parameters when a person is within a prescribed range. Alternatively, biometric parameter sensing device 77 can be turned on by the presence of the person using a proximity sensor or the like. The engine disclosed in U.S. Pat. No. 5,386,103 is capable of sensing parameters while the subject person is several feet away. In any event, as the person approaches remote access unit 60, facial parameters are sensed in step A. In step B, the data of the sensed parameters are compared with templates stored in memory device 64 of remote access unit 60.

In step C, local access unit 60 determines if the approaching person has been identified through steps A and B and, if so, operates access control device 78 to grant access to the person in step D. Step D can require that the person press a button and/or turn a door handle to unlock the door. Also, an indication of granted access, such as a green light or a message on display 70 can be enunciated. If the determination in step C is that the person was not identified, the procedure branches to step E. For example, if it is the first time the person has approached the particular entrance and thus corresponding facial data is not stored in local access unit 60, if the environment (such as lighting) has changed since the time of the last collected facial data of the person, or if the person is not an authorized (i.e. enrolled) person, the facial parameter data of the person will not correspond to facial parameter data stored as templates in memory device 64. In step E, the access granted indicator is not enunciated and the person is prompted, through a message on display 70, to touch biometric parameter sensing device 76 with their finger to obtain a fingerprint scan.

In step F, the data corresponding to fingerprint parameters obtained in step E are compared with fingerprint parameters in templates stored in memory device 64 (see step D of the primary enrollment procedure described above with reference to FIG. 2). If the person is authorized for access, i.e. has been enrolled, their fingerprint parameter data will correspond to a stored template in comparison step F. If the fingerprint parameters do not correspond to template, the person is not identified in step G, is not authorized, and thus is not granted access. Additionally, in step H, an alarm can be sounded, proper personnel can be notified, or the attempted entrance can be recorded for later review in the manner described in detail below. If the person is identified in step G, the procedure continues to Step I.

In step I, the person who has been identified through fingerprint parameter data as being enrolled and thus authorized, but not identified through facial parameter data, is prompted by a message on display 70, to look towards local access unit 60 while biometric parameter sensing device 77 senses facial parameters of the person. The facial parameters are converted to data and stored as a template in memory device 64 in step J in correspondence with the existing biometric data and corresponding data downloaded and stored during step D of the primary enrollment process described above. Access is granted to the authorized person in step K. The procedure is then reset and returns to step A to await the next person.

The template including facial parameter data stored in step J is used (along with other stored templates having facial parameter data) in comparison step B the next time the person approaches local access unit 60. Therefore, it is more likely that the person will be recognized in steps A–D above upon the person's next attempted entry and thus the relative inconvenience of steps E–J will not be required. However, steps E–J, i.e. the secondary enrollment procedure, can be accomplished anytime a person is not identified by virtue of facial parameters in step C. Eventually, enough facial parameter data is stored in memory device 64 to allow access of the authorized person in a variety of environmental conditions at the particular entrance. A similar procedure can be accomplished at other local access units 60, i.e. each entrance that the person uses. Of course, if the person alters their face by growing or shaving facial hair, gaining or losing a large amount of weight, having cosmetic surgery, or the like, the secondary enrollment of steps E–J will be accomplished again upon the person's next entry. Keep in mind that the user is always recognized through at least the first enrollment parameters, i.e fingerprint parameters, or the second enrollment parameters, i.e facial parameters, prior to being granted access.

Figure 4:
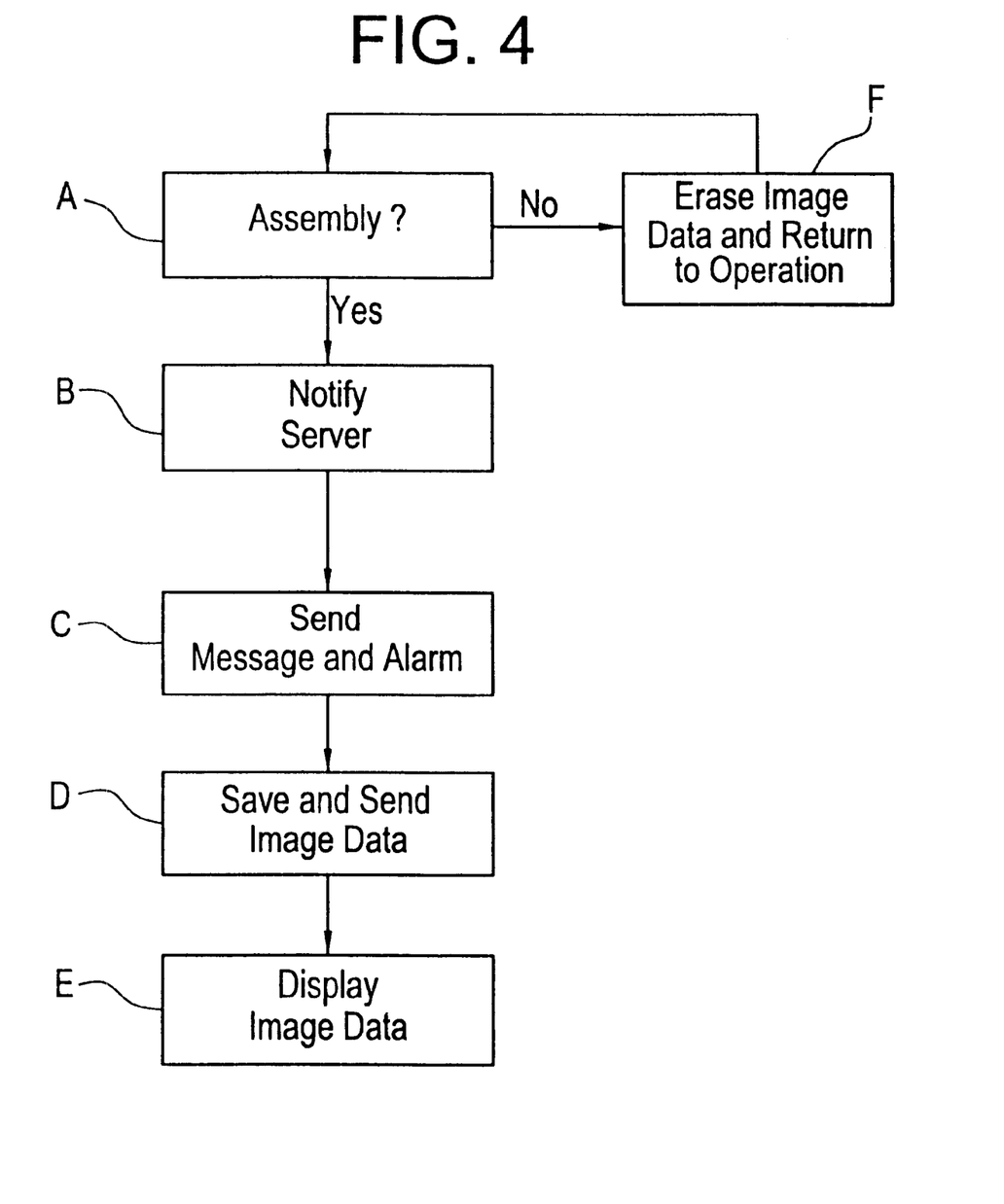
FIG. 4 is a flow chart of the anomaly enunciation procedure.

FIG. 4 illustrates a procedure for handling anomalies, such as unauthorized persons attempting to gain access, or unauthorized persons gaining access on the coattails of authorized persons. For example, each time access is granted in steps D or K of FIG. 3, local access unit 60 can count the number of persons passing through the entrance. If more than one person enters a "tailgating" anomaly is detected. Counting can be accomplished with biometric parameter collection device 77 or with any appropriate sensor, such as a photo sensor, proximity sensor, or the like. Further, an anomaly can be any situation other than the normal granting of access to an authorized person within their access parameters. An anomaly can result from the satisfaction of any predetermined criterion. For example, it may be desirable to know if a particular authorized person or persons, gains access more than a preset number of times. Also, it may be desirable to know if a previously authorized person whose access privileges have been revoked is near an entrance. Local access unit 60 is programmed to detect any anomalies under conditions set forth by a system administrator or other supervisory person and programmed into the control program.

In step A it is determined if an anomaly is present based on the programmed conditions. If an anomaly is present, local access terminal 60 notifies server 40 over communication channel 80 in step B. Server 40 can be programmed to notify appropriate personnel by one or more of sounding an alarm, sending a message (by email, fax, telephone for example), or the like in step C. As noted above, biometric parameter sensing device 77 collects image data of each approaching person or persons. Ordinarily, the image data is discarded, i.e erased from memory shortly after being recorded in step F. However, in the event of an anomaly, the previous several seconds of image data is saved and sent to server 40 over communication channel 80 for display in substantially real time or for later review in step D. Accordingly, images, i.e. video, of each anomaly creating approach can be viewed in step E to determine the appropriate action. For example, security personnel can communicate with the unauthorized person or persons causing the anomaly through the microphones 52 and 72 and speakers 54 and 74 to ascertain the person's status or to warn the person of their violation of security policy.

If an anomaly is not detected in step A, the image data recorded over the previous time period is erased in step F and processing returns to step A. Accordingly, a "loop" of video image data is recorded over and over and only saved or played back when an anomaly is detected. Therefore, there is no need to have personnel constantly view surveillance video. The personnel is notified when there has been an anomaly and shown only the relevant video images. The notified person or persons can be anyone coupled to the network of FIG. 1 or otherwise in communication with server 40 through any type of communication channel. The anomaly detection procedure can run constantly in parallel with other processing. Also, instead of automatically enunciating an alarm or the like, the anomaly handling procedure can prompt the person to press a "doorbell" button to notify and communicate with security personnel or other appropriate personnel, such as a receptionist. The button can be integrated with the fingerprint scanner of biometric parameter sensing device 76 to thereby obtain a fingerprint scan of the person attempting entry. The personnel can then normally grant or deny access. All access information, such as time, date and identity of persons granted or denied access (including approach video) can be logged and processed by local access units 60 and server 40 for statistical purposes, asset allocation, or for any other reason.

It can be seen that the preferred embodiment provides the convenience of reliable biometric access control regardless of environmental variables without sacrificing accuracy. Also, the preferred embodiment processes the biometric parameters at the entrance and thus biometric identification can be accomplished very quickly. The preferred embodiment uses fingerprint parameters for a primary enrollment and facial parameters for a secondary enrollment. However, any biometric or other parameters can be used for each enrollment. The primary enrollment can be accomplished by using a PIN number as identifying data in combination with or in place of biometric parameters. Also, the secondary enrollment can be omitted and identification at the local access unit can be accomplished by the primary enrollment only. For example, enrollment and identification can be accomplished by virtue of sensing of a single biometric parameter with the server downloading templates to the local access units. Access can be granted by sensing the same parameters at the local access units and comparing to the downloaded templates stored in the local access units.

There can be any number of local access units. Any hardware and/or software can be used in the invention for accomplishing the functions disclosed above. The various data communication and storage can be accomplished using any appropriate formats, protocols, and media. The various disclosed features of the invention can be combined in any manner. The control programs can be programmed in any language by one of skill in the art based on the functions disclosed herein. Any biometric technologies can be used for identification in the invention and any type of sensors or scanners can be used to collect the appropriate data or parameters. The invention can be applied to identification and/or verification systems. The access device can be any device for selectively providing access. The invention can be used to control entry into an area or exit from the area. Accordingly, the term "entrance", as used herein, refers to a door, gate, passage, or the like through which persons can enter or leave an area.

The invention has been described through a preferred embodiment. However various modifications can be made without departing from the scope of the invention as defined by the appended claims.

What is claimed:

1. An apparatus for controlling access into an area to, comprising:
   a server including server memory and a server data collection device configured to collect identification data assigned to an authorized person;
   a local access unit located at an entrance to the area and including local memory, a local processor, a local biometric parameter sensing device, a local data collection device and an access control device; and
   a communication channel for downloading the identification data from the server to the local access unit;
   wherein said local processor is operative to compare biometric parameter data of a person proximate the entrance collected by said local biometric parameter sensing device with biometric parameter data stored in said local memory and to grant access to the area by operating said access control device if the biometric parameter data collected by said local biometric parameter sensing device and biometric parameter data stored in said local memory correspond to one another, and wherein said local processor is operative to prompt the person to enter the identification data through said local data collection device and grant access to the area by operating said access control device only when the identification data of an authorized person is entered if the biometric parameter data collected by said local biometric parameter sensing device and the biometric parameter data stored in said local memory do not correspond, and wherein said local processor is also operative to store the biometric parameter data collected by said local biometric parameter sensing device in correspondence with the identification data in said local memory when the biometric parameter data collected by said local biometric parameter sensing device and the biometric parameter data stored in said local memory do not correspond and the identification data of an authorized person is entered through said local data collection device.

2. An apparatus as recited in claim 1, wherein said server data collection device is a server biometric parameter sensing device, said local data collection device is an auxiliary local biometric parameter sensing device, and the identification data is biometric parameter data.

3. An apparatus as recited in claim 2, wherein said server biometric parameter sensing device is of the same type as said auxiliary biometric parameter sensing device.

4. An apparatus as recited in claim 3, wherein said server biometric parameter sensing device is a fingerprint parameter sensing device, said auxiliary biometric parameter sensing device is fingerprint parameter sensing device, and said local biometric parameter sensing device is a facial parameter sensing device.

5. An apparatus as recited in claim 4, wherein there are plural local access units located at respective entrances and wherein said communication channel downloads the identification data to each of said local access units.

6. An apparatus as recited in claim 1, wherein said local biometric parameter sensing device comprises a video camera and wherein said local processor is operative to store image data collected by said video camera and upload said video data over said communication channel to said server when an anomaly is detected.

7. An apparatus for controlling access into an area comprising:
   a server including server memory and a server data collection device configured to collect identification data assigned to an authorized person;
   plural access units associated with respective entrances, each local access unit including a local memory, a local processor, a local data collection device and an access control device; and
   a communication channel for downloading the identification data from the server to each of the plural local access units;
   wherein said local processor is operative to compare data collected by the one of said local access units with identification data downloaded over said communication channel and operate the entrance control device only when the identification data of an authorized person is entered; and
   wherein, when the identification data downloaded over said communication channel and the biometric parameter data collected by the one of said local access units and stored in said local memory do not correspond, and the identification data of an authorized person is entered through said local data collection device, the local processor is also operative to store the biometric parameter data collected by one of said local access and the identification data of an authorized person is entered through said local data collection device.

8. An apparatus as recited in claim 7, wherein said server data collection device comprises a server biometric parameter sensing device and the identification data is biometric parameter data.

9. An apparatus as recited in claim 8, wherein said local data collection device comprises an auxiliary biometric parameter sensing device of the same type as said server biometric parameter sensing device.

10. An apparatus as recited in claim 9, wherein said local access units each comprises a local biometric parameter sensing device of a different type than said auxiliary biometric parameter sensing device.

11. An apparatus as recited in claim 9, wherein said local processor is operative to compare biometric parameter data of a person proximate the entrance collected by said local biometric parameter sensing device with biometric parameter data stored in said local memory and to grant access by operating said access control device if the biometric parameter data collected by said local biometric parameter sensing device and biometric parameter data stored in said local memory correspond to one another, and wherein said local processor is operative to prompt the person to enter biometric parameters through said auxiliary biometric parameter sensing device and grant access by operating said access control device only when the biometric parameter data of an authorized person is entered through said auxiliary biometric parameter sensing device if the biometric parameter data collected by said local biometric parameter sensing device and the biometric parameter data stored in said local memory do not correspond, and wherein said local processor is also operative to store the biometric parameter data collected by said local biometric parameter sensing device in correspondence with the biometric parameter data in said local memory when the biometric parameter data collected by said local biometric parameter sensing device and the biometric parameter data stored in said local memory do not correspond and the biometric parameter data entered through said auxiliary biometric parameter sensing device corresponds to an authorized person.

12. An apparatus as recited in claim 11, wherein said server biometric parameter sensing device is a fingerprint parameter sensing device, said auxiliary biometric parameter sensing device is fingerprint parameter sensing device, and said local biometric parameter sensing device is a facial parameter sensing device.

13. A method of controlling access into an area comprising the steps of:
collecting identification data assigned to an authorized person with a server;
downloading the identification data from the server to a local access unit located at an entrance and having an access control device;
comparing biometric parameter data of a person collected proximate the entrance by said local access unit with biometric parameter data stored in the local access unit and granting access by operating the access control device if the biometric parameter data collected proximate the entrance and biometric parameter data stored in the local access unit correspond to one another;
prompting the person to enter the identification data into the local access unit and granting access by operating the access control device only when the identification data of an authorized person is entered if the biometric parameter data collected proximate the entrance and the biometric parameter data stored in said local access unit do not correspond; and
storing the biometric parameter data collected proximate the entrance in correspondence with the entered identification data in the local access unit when the biometric parameter data collected proximate the entrance and the biometric parameter data stored in the local access unit do not correspond and the identification data of an authorized person is entered through the local access unit.

14. A method as recited in claim 13, wherein the identification data is biometric parameter data.

15. A method as recited in claim 14, wherein the biometric parameter data collected proximate the entrance is of a different type than the biometric parameter data collected as the identification data.

16. A method as recited in claim 15, wherein the biometric parameter data collected proximate the entrance is facial parameter data and the biometric parameter data collected as the identification data is fingerprint parameter data.

17. A method as recited in claim 15, wherein said downloading step comprises downloading the identification data to plural local access units located proximate respective entrances.

18. A method of controlling access into an area comprising:
collecting identification data assigned to an authorized person with a server;
downloading the identification data from the server to each of plural access units associated with respective entrances to the area, each local access unit including an entrance control device;
collecting data with one of the local access units;
comparing the data collected by one of the local access units with the identification data downloaded during said downloading step;
operating the entrance control device collected based on results of said comparing step;
prompting a person seeking access to enter identification data if the identification data downloaded during said downloading step and the data collected with one of the local access units do not correspond;
storing the identification data collected by one of said local access units when the identification data downloaded over said communication channel and biometric data collected by said local access units and stored in the local memory do not correspond and the identification data of an authorized person is entered through said local data collection device.

19. A method as recited in claim 18, wherein the identification data is biometric parameter data and the data collected by the local access units is biometric parameter data.

20. A method as recited in claim 19, wherein the biometric parameter data collected by the one of the local access units is of a different type than the biometric parameter data collected as the identification data.

21. A method as recited in claim 20, wherein the biometric parameter data collected by the one of the local access units is facial parameter data and the biometric parameter data collected as the identification data is fingerprint data.

22. A method of controlling access into an area comprising the steps of:
a primary enrollment step in which identification data is collected, assigned to an authorized person, and stored;
an identification step wherein a biometric parameter is sensed, converted to biometric parameter data, and wherein said biometric parameter data is then compared to said stored identification data;
an primary access granting step wherein, when the biometric parameter data corresponds to the stored identification data, access is granted to said authorized person, or wherein when the biometric parameter data does not correspond to the stored identification data, access is denied and at least one additional biometric parameter is sensed and compared to the stored identification data
a secondary enrollment step wherein when said additional biometric parameter data corresponds to the stored identification data, said additional biometric parameter data is stored and correlated with said identification data;
a secondary access granting step, wherein when said additional biometric parameter data corresponds to the stored identification data, access is granted to said authorized person.

23. A method as recited in claim 22, wherein said primary enrollment step is conducted with a centralized server and said secondary enrollment step is conducted with a local access unit. e 24. A method as recited in claim 23 wherein the identification data is biometric data and said primary enrollment step further comprises sensing a biometric parameter and converting the biometric parameter to biometric parameter data.

25. A method as recited in claim 24, wherein the biometric parameter sensed in said secondary enrollment step varies due to environmental conditions surrounding said local access units that were not present during said primary enrollment step.

26. A method as recited in claim 25, wherein the biometric parameter sensed in said primary enrollment step is a fingerprint parameter and the biometric parameter sensed in said secondary enrollment step is a facial parameter.

27. A method of controlling access into an area comprising the steps of:

collecting identification data assigned to an authorized person with a server;

downloading the identification data from the server to a local access unit located at an entrance and having an access control device;

collecting entrance biometric parameter data of a person at the time of an attempted entry into the area with said local access and comparing the entrance biometric parameter data with biometric parameter data stored in the local access unit and granting access by operating the access control device if the entrance biometric parameter data and biometric parameter data stored in the local access unit correspond to one another;

prompting the person to enter the identification data into the local access unit and granting access by operating the access control device only when the identification data of an authorized person is entered if the entrance biometric parameter data and the biometric parameter data stored in said local access unit do not correspond; and storing the entrance biometric parameter data in correspondence with the entered identification data in the local access unit when the entrance biometric parameter data and the biometric parameter data stored in the local access unit do not correspond and the identification data of an authorized person is entered through the local access unit.

* * * * *